Figure 1:
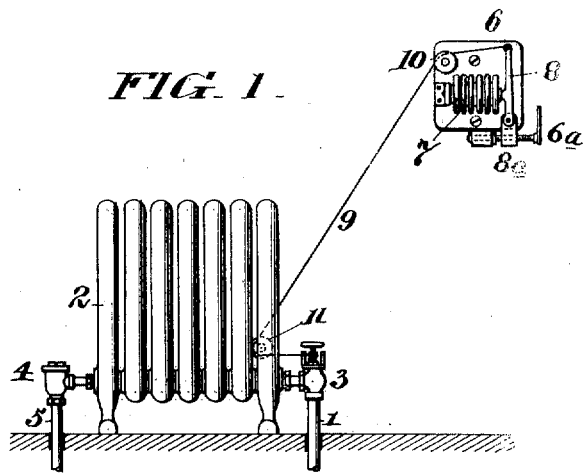

J. B. DOBSON.
STEAM HEATING SYSTEM.
APPLICATION FILED MAY 3, 1913.

1,212,749.

Patented Jan. 16, 1917.

Witnesses
Daniel Webster Jr.
E. W. Smith

Inventor
John B. Dobson
By
Attorney

UNITED STATES PATENT OFFICE.

JOHN B. DOBSON, OF ATLANTA, GEORGIA, ASSIGNOR TO WARREN WEBSTER & COMPANY, A CORPORATION OF NEW JERSEY.

STEAM-HEATING SYSTEM.

1,212,749.  Specification of Letters Patent.  Patented Jan. 16, 1917.

Application filed May 3, 1913. Serial No. 765,204.

*To all whom it may concern:*

Be it known that I, JOHN B. DOBSON, citizen of the United States, and resident of Atlanta, county of Fulton, and State of Georgia, have invented an Improvement in Steam-Heating Systems, of which the following is a specification.

The object of my invention is to provide means, in a steam heating apparatus, for automatically controlling the supply of steam to the radiator in accordance with the requirements of the surrounding atmosphere, so that a constant or substantially constant temperature may be maintained in the room, the apparatus being responsive to every variation, in a gradual manner, to the end that there may be a continuous supply of steam to the radiator, and said supply throttled to a greater or less extent as the temperature conditions of the room may require. In the common method employed in steam heating systems, the supply valve controlling the steam to the radiator is automatically completely shut off or fully opened at intervals under the control of a thermostatic device, and such variations are therefore abrupt and do not secure the highest efficiency, nor do they maintain the temperature as constant as it should be. By the employment of my improvements, the temperature may be so gradually changed by the operation of the device that reversal of the device will respond to the very slightest variations in temperature conditions and cause the apparatus to be operated in a responsive manner thereto.

My invention consists in providing the radiator with a steam supply valve which is positively moved in one direction by a spring and automatically moved in the other direction against the action of the spring, to control the movement of the valve piece for regulating the amount of steam which is supplied to the radiator, and combining therewith a thermostatically operated motor located at a distance from the radiator and connected with the valve by a suitable connection leading from an operative portion of the motor device to the valve stem or a part connected therewith for operating the valve piece.

My invention also comprehends the construction of the valve in such manner that the valve piece may be relatively adjusted by hand to vary the degree of normal opening, while maintaining the operative connection and relation with the thermostatically operated means for changing the degree of opening of the valve within predetermined limits.

My invention also comprehends details of construction which, together with the features above specified, will be better understood by reference to the drawings, in which:—

Figure 2:
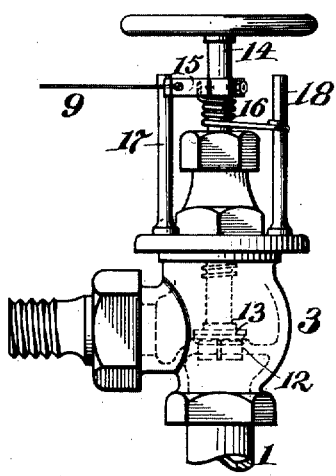
Figure 3:
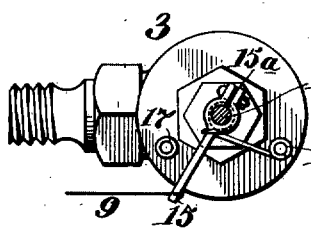

Figure 1 is an elevation of a radiator and its connections and combined with my improvements for automatic regulation thereof; Fig. 2 is an elevation of the valve device shown in Fig. 1; Fig. 3 is a plan view of the same with the upper portion of the valve stem removed; and Fig. 4 is an elevation of a modified form of valve also embodying my invention.

2 is the radiator and may be of any suitable construction. As shown, the steam is supplied to the radiator from a pipe 1 through a supply valve 3. The water and air from the radiator are delivered to the return pipe 5 through a return trap or valve 4. The heating system may be operated with a partial vacuum in the return pipe, as is customary in vacuum systems, or with approximately atmospheric pressure therein, such as is employed in gravity systems, these adaptations being immaterial to my invention.

The supply valves 3 may be made in various forms, but I have illustrated two special forms which are illustrative of the general character of the invention, in so far as it involves the valve mechanism. Referring to the valve shown in Figs. 1, 2 and 3, the valve body is provided with a valve seat 12 which is controlled by the valve piece 13, the latter being adapted to be raised or lowered by rotating the spindle 14 in the usual way employed in operating globe valves. Clamped upon the spindle 14, so as to be frictionally held thereon, is an arm 15, the friction being increased or decreased as may be required by the split end of the arm and adjusting screw indicated at 15ª. Any other suitable frictional contact may be employed. A spring 16 surrounds the spindle, and has one end connected with a post 18 and the other end connected to or made to act upon the arm 15 so as to normally swing the arm 15 in the arc of a circle between the posts 17 and 18. As shown in the drawings, this spring acts to rotate the spindle 14 to raise the valve piece 13 and admit more steam to the radiator. The extent of the opening is limited by contact of the arm 15 with the post 18. The arm 15 is connected by a flexible wire or light chain 9 with a motor device 6 which operates it in accordance with variations in temperature in the room. As shown, the motor device 6 may comprise a thermostatic expansible member 7 of the bellows type which may be partly filled with an expansible saturated atmosphere or vapor derived from a fluid, or may be filled or partly filled with any medium heretofore employed in thermostatic members of this character which expand upon an increase of temperature of the surrounding atmosphere and contract by a cooling of the same. The expansible member 7 operates a lever 8 whose free end is connected to the wire or chain 9, so that any movement of said lever will be imparted to the arm 15 of the valve. To enable the thermostatic motor device 6 to be located at a distance from the radiator, the wire or chain 9 may be guided over pulleys 10 and 11 fastened in any suitable manner to any convenient support. As shown, one of said pulleys 10 is secured to the base of the motor and the other of said pulleys 11 is secured upon the radiator to provide a horizontal stretch of the wire between said guide wheel 11 and the arm 15 of the valve device. It is furthermore to be understood that, in the preferred construction of this valve device, the occupant of the room may adjust the valve piece by turning the spindle 14 by hand to the desired position to secure reasonable comfort in the temperature of the room. If then the room should become cool, or windows should be suddenly opened to chill the thermostatic motor device, the tension on the wire or chain 9 will be reduced and the spring 16 will rotate the spindle 14 with the result that the valve piece 13 will open the port 12 to a greater extent and thereby admit more steam to the radiator for the purpose of automatically raising the temperature of the surrounding atmosphere. In this manner, the thermostatic motor device will produce all degrees of adjustment of the valve piece to insure a relatively normal temperature being maintained and to quickly control the valve piece should any abnormal variations in temperature of the room occur by opening of doors or windows. At the same time, the valve piece is within control of the occupant of the room, for any definite opening of the valve to suit widely different conditions in the outside atmosphere which may occur from time to time through the season. From this, it will be seen that the valve has two capacities; one for static adjustment, which is performed by hand, and the other for automatic adjustment which is controlled by the thermostatic motor device, the latter adjustment acting to modify to some extent the static adjustment of the former. In this way, the automatic adjustment does not have to have excessive limits of operation, and does not interfere with the free independence of the occupant of the room to vary the normal opening of the valve to suit the varying conditions of the outside atmosphere. If the thermostatic motor device is arranged to move the lever 8 only at a definite variation, approximating the maximum temperature permitted, then it is evident that the device as a whole will only be adapted for that maximum temperature, but thermostatic motor devices and thermostatic control devices are well known in the market which may be adjusted for various temperatures and may be employed in place of the particular motor here shown by way of illustration. I have indicated in the thermostatic motor device 6, a screw and pointer 6ª for adjusting the pivot block 8ª for the lever 8, so as to change its time of operation under the action of the bellows 7, whereby the lever 8 will respond to operate the valve at a higher or lower temperature, thereby giving capacity for the operation of the automatic mechanism for varying maximum temperatures in the room, said manner of adjustment being given by way of example only and in no sense to be taken as a restriction.

Figure 4:
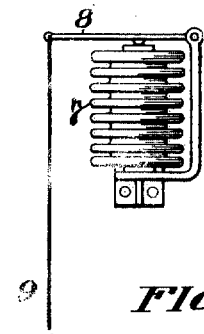

In Fig. 4, I have shown the valve device arranged for a vertically reciprocating valve stem 14ª and valve piece 13ª, instead of rotating said parts as in the case of Fig. 2. In this construction, a spring 16ª tends to open the valve by moving the stem upwardly, and the lever 15ª acts to close the valve by moving the valve stem downward against the action of the spring. The lever 15ª is operated by the wire or chain 9 connected with the lever 8 of the thermostatic member 7 arranged at a distance. The valve device is further provided with a hand operated screw 19 which may be adjusted by hand to limit the maximum opening of the valve under the action of the spring 16ª to thereby give the occupant of the room the power to vary the maximum admission of steam, or as in the other construction of valve, to shut off all supply of steam when it is not desired to have the radiator in use.

I do not restrict myself in any manner to the details of construction of the valve mechanism, but give the examples here shown as suitable constructions for embodying my improvements in operative form, and therefore while I have shown the preferred constructions, I do not limit myself thereto, as these may be modified in various ways without departing from the spirit of the invention.

Having now described my invention, what I claim as new and desire to secure by Letters Patent, is:—

1. In a heating system, the combination of a radiator, with a steam supply valve having a spring actuated valve piece upon the radiator to mechanically tend to vary the admission of steam to the radiator, a thermostatically operated motor device at a distance from the radiator, a guiding device fixed to the radiator in horizontal alinement with the valve, connecting means between the thermostatically operated motor device and the spring actuated valve piece consisting of a flexible cable guided about the guiding device to pull in a horizontal direction upon the valve whereby the action of the spring is opposed and controlled to overcome in an automatic manner to change the supply of steam to the radiator to suit the requirements of the changing temperature of the room, and hand operable means for opening or closing the valve independently of the automatic means.

2. In a heating system, the combination of a radiator, with a steam supply valve having a spring actuated valve piece to mechanically tend to reduce the admission of steam to the radiator, a hand operated part on the supply valve to manually adjust the normal opening of the valve to be permitted and to shut off all supply of steam at will, a thermostatically operated motor device at a distance from the radiator, and connecting means between the thermostatically operated motor device and hand adjusting part of the spring actuated valve piece whereby the action of the spring is continually opposed and controlled or overcome in an automatic and continuous manner to reduce the supply of steam to the radiator gradually and to such extent only to suit the requirements of the changing temperature of the room, said automatic adjustment of the valve piece being impressed upon the valve as a whole in addition to the manual adjustment and to partially close the valve only at any time.

3. In a heating system, the combination of a radiator, a valve for supplying steam thereto having a movable valve piece, a spring to move the valve piece to increase the supply of steam to the radiator to a maximum, a thermostatic motor at a distance from the radiator, means connecting the thermostatic motor with the valve piece to automatically oppose the action of the spring above the normal temperature required and vice versa to reduce the steam supply from a maximum to minimum normal supply, and hand operated means independent of the spring and motor for adjusting the normal maximum permissible opening of the valve while maintaining the automatic control thereof and also for fully closing the valve to shut off the steam supply without affecting the thermostatic motor and its connections.

4. The combination of a radiator, a steam supply globe valve therefor having a rotatable valve stem, hand operable means for rotating the valve for more than one revolution, a spring constantly acting to rotate the stem in one direction to open the valve, a thermostatic motor at a distance from the valve, a flexible connection between the thermostatic motor and valve stem to rotate it in opposition to the spring to reduce the supply of steam but not close the valve, means between the valve stem and flexible connection to permit the hand adjustment of the stem to close the valve, and means for guiding the flexible connection.

5. The combination of a radiator, a steam supply valve therefor having a rotatable stem and valve piece, an arm frictionally held to the rotatable stem whereby the valve piece may be adjusted upon the stem, a spring constantly acting on the arm to rotate the stem in one direction, means to limit the movement of the arm, a thermostatic motor, and a connection between the motor and the arm whereby the latter is moved in opposition to the spring when the temperature adjacent to the motor is too high and vice versa.

6. The combination of a radiator, a steam supply valve therefor having a rotatable stem and valve piece, an arm frictionally held to the rotatable stem for adjusting the valve piece, a spring constantly acting on the arm to rotate the stem in one direction, hand means for turning the stem and adjusting the valve piece relatively to the frictionally held arm, means to limit the movement of the arm, a thermostatic motor, and a connection between the motor and the arm whereby the latter is moved in opposition to the spring when the temperature adjacent to the motor is too high and vice versa.

7. The combination of a radiator, a steam supply valve therefor having a movable part to control the passage of steam therethrough, continually acting means substantially independent of the temperature of the atmosphere for applying force to move the movable part of the valve in one direction, a thermostatic motor and connection between it and the movable part of the valve to continually act to move it in the opposite direction under varying conditions of temperature of the atmosphere surrounding the thermostatic motor, whereby the movable part of the valve will be continually under the combined actions of two oppositely directed forces to vary the supply of steam to the radiator in accordance with the variations in temperature of the atmosphere surrounding the thermostatic motor, and hand means for adjusting the normal maximum opening and closing of the movable part of the valve during the automatic control thereof.

In testimony of which invention, I hereunto set my hand.

JOHN B. DOBSON.

Witnesses:
RALPH G. DOBSON,
FRANK H. VERLANDER, Jr.